March 1, 1927. 1,619,477
C. B. KURTZ
TRANSMISSION MECHANISM
Filed Aug. 23, 1918 2 Sheets-Sheet 2
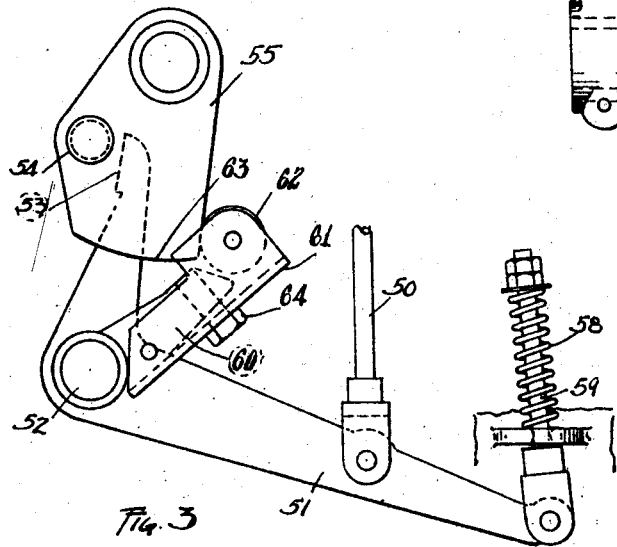
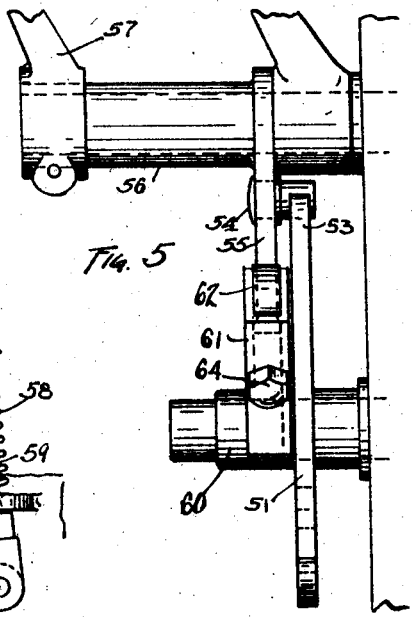
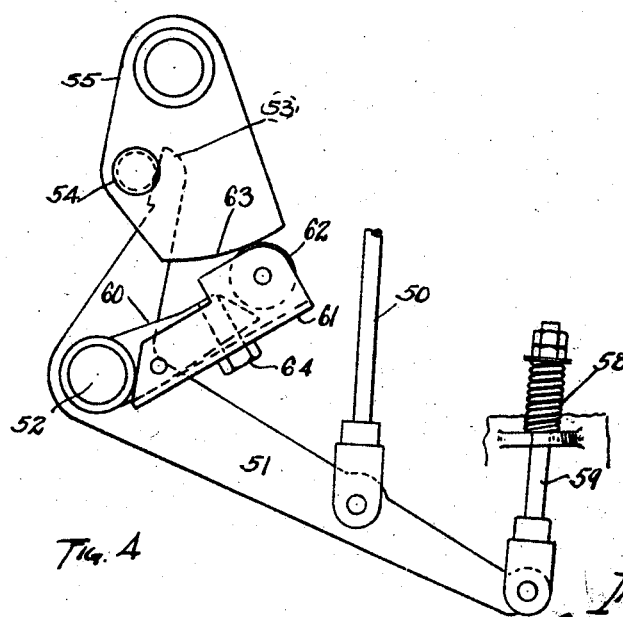
INVENTOR
Cyrus B. Kurtz
By Fay, Oberlin & Fay.
ATTORNEYS.

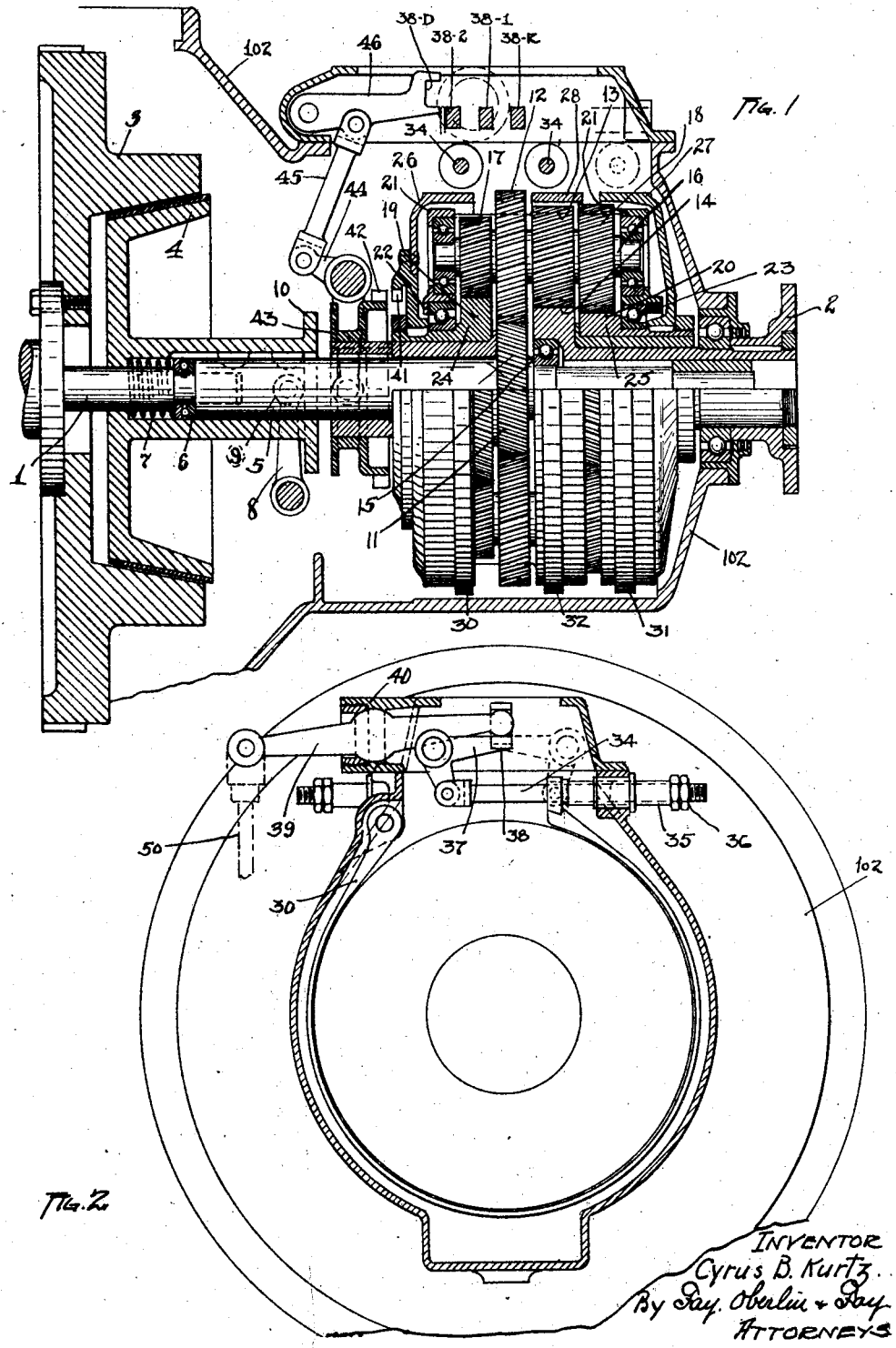

Patented Mar. 1, 1927.

1,619,477

UNITED STATES PATENT OFFICE.

CYRUS B. KURTZ, OF LAKEWOOD, OHIO.

TRANSMISSION MECHANISM.

Application filed August 23, 1918. Serial No. 251,044.

The present invention, relating, as indicated, to power transmission mechanism, is particularly concerned with an improved type of transmission, adapted to transmit power through different driving connections between two shafts at various relations of speed and torque. A further object of the invention is the provision of simple and easily manipulated means for controlling the operation of such a transmission. A still further object of the invention is the provision of mechanism which effectively prevents the engagement of more than one of the driving connections at the same time, and also allows for the selection and preparation of any one of the gearing connections for action before any power is transmitted through these connections. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Fig. 1 is a longitudinal central section through my improved transmission, certain parts or members being shown in elevation; Fig. 2 is an end view of the transmission as seen from within the housing or enclosing casing; Fig. 3 is a side elevation of the operating connections for the main clutch and the variable speed gearing; Fig. 4 is a similar view, showing the same when operated; and Fig. 5 is a rear elevation of the mechanism shown in Figs. 3 and 4.

The present transmission may be conveniently positioned and assembled as a unit with a motor driven shaft, such, for example, as the crank shaft of an internal combustion engine, and may therefore be enclosed in the same casing that is ordinarily used for the purpose of enclosing the engine clutch between the engine driven shaft and the shaft operated thereby. In Fig. 1 there is shown an engine or driving shaft 1, which terminates in an enclosing housing 102, constructed to enclose, not only the extending end of the shaft 1, and the clutch mounted thereon, but also my improved transmission mechanism which is mounted between the driving shaft 1 and the driven shaft 2 in alignment therewith and extending through the opposite side of the casing 102.

Mounted on the end of the driving shaft 1 is a clutch, here shown as of the common cone type, of which the portion 3 is attached to the driving shaft 1, and the portion 4 is axially movable along the shaft 1 and is carried on a sleeve 5 which is keyed thereto, and which is aligned with the shaft 1 and separated therefrom by a thrust bearing 6. Between the thrust bearing 6 and the inner portion of the clutch 4 is disposed a coiled spring 7, which serves to normally maintain the clutch members 3 and 4 in engagement, and hence lock the sleeve 5 to the driving shaft for rotation thereby. This clutch may be disengaged by the swinging of the pivoted lever 8, the ends 9 of which engage against a shifting collar 10 formed on the inner member 4 of the clutch, and movement of this lever 8 to the right, as shown in Fig. 1, will move the member 4 of the clutch out of engagement from the member 3.

Keyed, or otherwise secured, to the sleeve or shaft 5, is a driving gear 11, which is in mesh with a second gear 12. The gear 12 is in alignment with the gear 13, engaged with a gear 14 on a sleeve which forms the tubular driven shaft 2, and which may of course, be connected or extended to the mechanism to be operated. Between the driving gear 11 and the driven gear 14, and, consequently, between the driving and driven shafts, there is interposed a bearing 15 adapted to withstand both radial and axial thrust. The gears 12 and 13, which are in axial alignment and are disposed about an axis parallel to the common axis of the driving and driven shafts, are two of a cluster of gears which are attached to, or mounted on, a planet shaft 16, which also carries gears 17 and 18 engaged respectively with gears 19 and 20, the mounting and function of which will be hereinafter described. There may be one or more of these clusters of gears of the planet shafts 16, disposed at equidistant intervals about the common axis of the driving and driven shafts, all being mounted of course within the casing 102 as indicated. It is understood that, if desired, a single planet shaft and cluster of gears may be employed, although in that case some provision must be made for counterweighting them.

The planet shaft 16 is rotatably mounted in the casing 21, which is rotatably carried on bearings 22 and 23, interposed between the casing and sleeves 24 and 25, respectively. These sleeves 24 and 25 carry the gears 19 and 20, respectively, and are continued into drums 26 and 27, respectively, which are disposed in alignment with a drum 28 formed on the casing 21. These drums 26, 27 and 28 are disposed adjacent to each other and are provided with encircling brake bands 30, 31 and 32, respectively.

Each of these brake bands has one end fixed to a suitable support on the casing 102, while the other end is adjustably carried on a rod 34, which may be adjusted by means of a sleeve 35 and lock nuts 36 to take up or extend the brake band with respect to the drum, over which it is carried. The rod 34 is attached at its other end to one arm of a bell crank lever 37 and is operated by the depression or downward movement of the end of this bell crank lever. The other ends 38 of the bell crank levers are positioned adjacent each other, as shown in Fig. 1, being disposed in the same horizontal plane and in alignment with each other, so that they may be conveniently operated by means of a single selecting lever or member 39, which is pivotally mounted in an extension 40 of the casing 102, so that it may swing in a horizontal plane into a position over any one of the lever ends 38, or into a neutral position between these adjacent ends.

The selecting lever 39 may be swung laterally in a horizontal plane by any suitable means, either by handle attached directly thereto, or by other mechanism.

The sleeve 24, which carries the gear 19, together with the drum 26, which is attached thereto, are normally free upon the sleeve or shaft 5, but may be clutched thereto by means of jaw clutch members 41 and 42, of which the clutch member 42 is carried on a shifting collar 43, which is keyed to the sleeve 5. This shifting collar may be moved into position to engage the jaws 41 and 42 by means of a bell crank lever 44, operated by a link 45 and a pivoted lever 46. The free end of this pivoted lever 46 is positioned adjacent to the lever ends 38 and in position to be engaged by the operating end of the selector member 39 when the latter is swung in a horizontal plane, while downward movement of this selector member, when positioned over the end of the lever 46, serves to shift the collar 43 to the right and to engage the clutch members 41 and 42.

For quietness of operation, I have found it desirable to use helical gearing, which can be done in this type of transmission, as the gears are permanently meshed, and I have so arranged the gearing that the thrust between the driving and driven gears 11 and 14 is directed oppositely and is received upon the thrust bearing 15.

The operation of my improved transmission is secured by the preliminary selection and engagement in preparation for operation of any one of the desired speeds which may be secured in the variable gearing and the subsequent operation of these speeds through the engagement of the main clutch between the shaft 1 and the sleeve or shaft 5. If it is assumed that the selector member 39 is in a neutral position, that is, at a neutral point between the lever ends 38, and it is desired to engage the lowest speed, such action is secured, (1) by disengaging the clutch 3—4 through movement of the lever 8, (2) by swinging the selector member 39 over the lever controlling the lowest speed, that is, the lever 38, which is shown at the center in Fig. 1, (3) by rocking the lever 39 in a vertical plane to depress the selected lever end $38^1$ and thus engage the band 30 upon the brake drum 26, and (4) by allowing the clutch 3—4 to be reengaged by the spring 7. The action in the gearing is then as follows:—The driving shaft transmits rotation to the gear 11, which tends to rotate the gear 12 in the opposite direction. The gear 24 is locked against rotation by the engagement of the brake band 30 on the drum 26, and hence the cluster of gears is caused to rotate about the axis of the shafts 1 and 2 and about the gear 24. This action causes rotation in the same direction as the rotation of the driving shaft, of the gear 14 on the driven shaft 2.

The four lever ends $38^D$, $38^2$, $38^1$, and $38^R$, which are shown in adjacent positions in Fig. 1, are formed with concave upper surfaces, designed to receive and center therein the end of the selector member or lever 39. Also, for convenience in the selection of the different gear ratios, I have connected the lever end $38^2$, which is at the left in Fig. 1, to operate the brake band 32 which engages the second or intermediate gear and the lever ends $38^1$ with the brake band 30, which engages the lowest or first speed. The lever end $38^R$, which is at the right in Fig. 1, is connected with the brake band 31, and thus a selector member 39 may be moved progressively from the position for first speed into the position for the second speed, and then into the position for third or direct drive.

If the second or intermediate speed is to be engaged, (1) the clutch 3—4 is first disengaged, (2) the selector member 39 moved into position over the lever end $38^2$, which is shown in the left of Fig. 1, (3) the selector member is rocked vertically to depress the selected lever end and engage the brake 32 on the drum 28, and (4) the clutch 3—4 is re-engaged. The brake band 32 holds the planet shafts from rotation about the axis of the shafts 1 and 2, and hence the drive is then from the gear 11 to the gear 12, and from the gear 13 to the gear 14 on the driven shaft 2.

To engage the reverse drive the selector member is positioned over the lever end 38$^R$, which is shown at the right in Fig. 1, and the same series of steps are followed, with the result that the gear 20 is held stationary and the cluster of gears are caused to roll about on this gear, thus imparting a reverse rotation to the driven shaft when compared with the direction of rotation of the driving shaft 1.

To directly engage the driving and driven shafts for unit rotation, the selector member 39 is positioned above into the forked end 38$^D$ of the lever 46, the clutch 3—4 having first been disengaged, and the selector member is then rocked to engage the clutch members 41 and 42, after which the clutch 3—4 is re-engaged. The gears 11 and 24 are then turned in unison and are in effect locked to the gears 12 and 17, and cause the planet shafts 16 and the cluster of gears thereon, together with the casings or drums 26, 27 and 28 to rotate as a unit about the common axis of the shafts 1 and 2, and in this way to similarly rotate the gear 14 and the driven shaft 2.

The selector member 39 is operated by connections which include a rod 50 pivotally attached to a bell crank lever 51, mounted to swing about an axis 52 and having a cup-shaped end 53 which may be engaged by means of a pin 54 on a plate 55, which is attached to and rocked by means of a sleeve 56 which carries the usual clutch pedal lever 57. The outer end of the lever 51 is normally held up in the position shown in Fig. 3 by means of a compression spring 58, operating against one end of a rod 59. The shaft 52 also carries a member 60 keyed thereto and adjustably bearing a plate 61 carrying a roller 62, which is adapted to be engaged by means of the curved surface 63 on the plate 55. This member 61 may be adjusted to take up wear and to set and determine the action of the clutch when first assembled by means of a bolt 64, passing through the plate 61 and member 60.

When the clutch pedal lever 57 is pressed out, it swings the plate 55 into the position which is shown in Figs. 4 and 5. The first action resulting upon this movement of the plate 55 is to swing the lever 60 connected to lever 8 to disengage the clutch 3—4 and relieve the spring pressure of the main clutch spring by swinging the roller 62 upon the curved cam surface 63 of the plate. This prevents continued movement of the clutch as the plate 55 is swinging further, causing pin 54 to engage the end 53 of the lever 51. As soon as the pin 54 engages the end 53 of the bell crank lever 51, the latter is rocked in a clock-wise direction, thus lifting the actuating end of the selector member 39 and disengaging whichever gear speed is in operation or the clutch 41—42, if that were engaged. The selector member 39 may then be swung in a horizontal plane into position to put in action any desired one of the gear speeds or the direct drive clutch which action will be effected by the depression of the actuating end of the lever 39 when the clutch pedal lever 57 is released, as it is then returned to its normal position by means of the spring 58 and the clutch spring 7.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In transmission mechanism, the combination of two shafts, variable speed epicyclic gear means connected to one shaft, a clutch adapted to connect said gear means to the other shaft, gripping means adapted to lock one of said gear means to render the same operative on the engagement of said clutch a single lever adapted to selectively actuate said gripping means.

2. In transmission mechanism, the combination of two shafts, variable speed epicyclic gear means connected to one shaft, a clutch adapted to connect said gear means to the other shaft, a plurality of brake means, each adapted to engage one of said gear means and render the same operative on the engagement of said clutch, and a selector member adapted to preliminarily engage for action one of said brake means and then actuate the same to operate one of said gear means.

3. In transmission mechanism, the combination of two shafts, variable speed epicyclic gear means connected to one shaft, a clutch adapted to connect said gear means to the other shaft, a plurality of brake means, each adapted to engage one of said gear means and render the same operative on the engagement of said clutch, and a selector member movable in position adjacent any one of said brake means, said member being also movable to engage and actuate the selected one of said brake means.

4. In transmission mechanism, the combination of two shafts, variable speed epicyclic gear means connected to one shaft, a clutch adapted to connect said gear means to the other shaft a selector member, a plurality of brake means, each adapted to engage one of said gear means for operation, the selector member movable in one plane into position adjacent any one of said brake means, said selector being also movable to engage and actuate the selected one of said brake means on the engagement of said clutch.

5. In transmission mechanism, the combination of two shafts, variable speed epicyclic gear means connected to one shaft, a clutch adapted to connect said gear means to the other shaft, a plurality of brake means, each adapted to engage one of said gear means for operation, a selector member pivoted to move into position adjacent any one of said brake means, said member being pivoted to swing in a different plane to engage and actuate the selected one of said brake means and means for causing said selector to actuate said selected brake means on the engagement of said clutch.

6. In transmission mechanism, the combination of two shafts, variable speed epicyclic gear means connected to one shaft, a clutch adapted to connect said gear means to the other shaft, a plurality of brake means, each adapted to engage one of said gear means for operation, a direct clutch adapted to rigidly connect said variable speed gear means with the disengageable element of said first-named clutch, a member adapted to preliminarily select for operation any one of said brake means or said direct clutch and means for causing said member to actuate said selected brake means or direct clutch upon operative engagement of said clutch.

7. In transmission mechanism, the combination with two shafts, variable speed epicyclic gear means connected to one shaft, a clutch adapted to connect said gear means to the other shaft, a plurality of brake means, each adapted to engage one of said gear means for operation, a direct clutch adapted to rigidly connect said variable speed gear means with the disengageable element of said first-named clutch, and a selector member pivoted to rock in one plane into position to engage any one of said brake means or said direct clutch, said member being pivoted to rock in another plane to actuate into engagement said selected brake or clutch.

8. In transmission mechanism, the combination of two shafts, variable speed epicyclic gear means connected to one shaft, a clutch adapted to connect said gear means to the other shaft, a plurality of brake means, each adapted to engage one of said gear means for operation, a direct clutch adapted to rigidly connect said variable speed gear means with the disengageable element of said first-named clutch, said brake means and said direct clutch having actuating portions arranged adjacent one another, and a selector member pivoted to swing into position over any one of said actuating portions, said member being also pivoted to swing into engagement with and actuate said selected one of said brake or clutch actuating portions.

9. In transmission mechanism, the combination of two shafts, variable speed epicyclic gear means connected to one shaft, a clutch adapted to connect said gear means to the other shaft, a plurality of brake means, each adapted to engage one of said gear means for operation, a direct clutch adapted to rigidly connect said variable speed gear means with the disengageable element of said first-named clutch, said brake means and said direct clutch having actuating portions arranged adjacent one another, and a selector member entirely disconnected from said clutch and brake means, said member being pivoted to swing into position over any one of said actuating portions, and said member being also pivoted to swing into engagement with and actuate one of said brake or clutch actuating portions.

10. In transmission mechanism, the combination of two shafts, normally inoperative variable speed, epicyclic gear means interposed between said shafts and normally operatively connected to one thereof, brake means adapted to engage and prepare for action one of said gear means, a single means adapted to so operate said brake means, and a clutch between the other of said two shafts and said gear means, said clutch upon engagement causing operation of said prepared gear means.

11. In transmission mechanism, the combination of two shafts, normally inoperative variable speed, epicyclic gear means interposed between said shafts and normally operatively connected to one thereof, brake means adapted to engage and prepare for action one of said gear means, and a single means adapted to operate said brake means, a clutch between the other of said two shafts and said gear means, the engagement of said clutch causing operation of said prepared gear means, and connections between said means and said clutch, said connections being adapted to operate said means before the actual engagement of said clutch.

12. In transmission mechanism, the combination of two shafts, normally inoperative variable speed, epicyclic gear means interposed between said shafts and normally operatively to one thereof, brake means adapted to engage and prepare for action one of said gear means, a single member adapted to operate said several brake means, a clutch between the other of said two shafts and said gear means, said clutch, upon engagement, causing operation of said prepared gear means, means adapted to operate said clutch, and connections between said means and said member, said connections being adapted to operate said member before operation of said clutch.

Signed by me, this 10th day of August, 1918.

CYRUS B. KURTZ.